B. C. INWOOD.
COCOA AND CHOCOLATE POT ATTACHMENT.
APPLICATION FILED JULY 13, 1908.
978,298.
Patented Dec. 13, 1910.
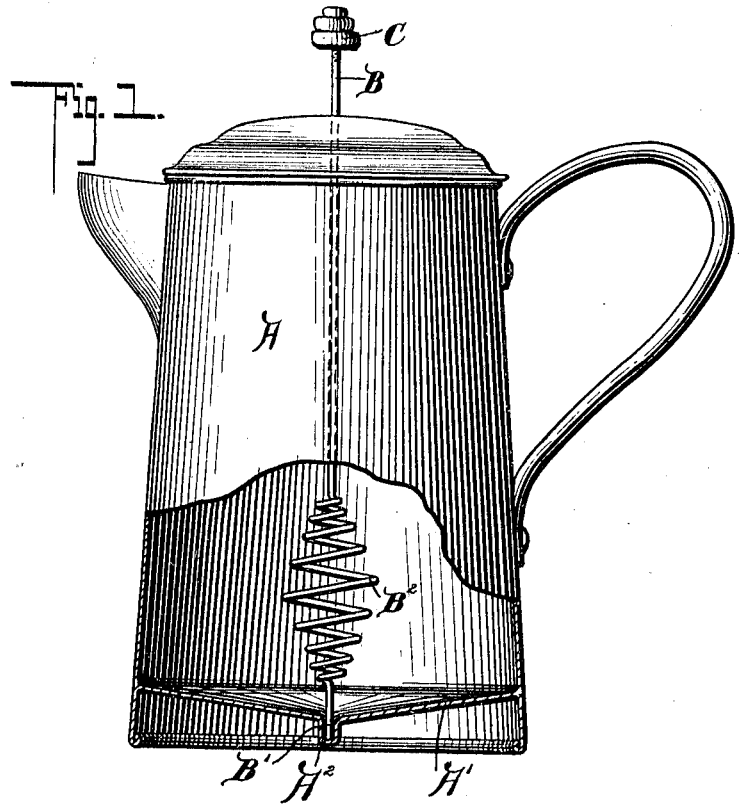
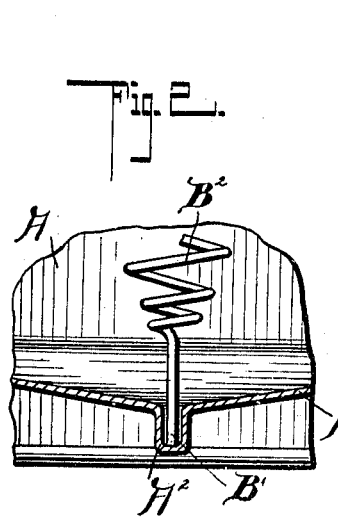
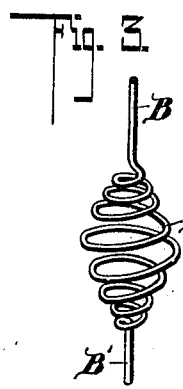
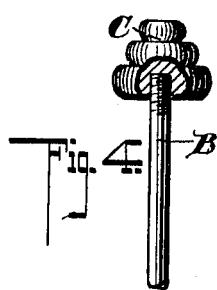
Witnesses
Philip H. Burch
Asa P. Wright
Inventor
B. C. Inwood,
By O'Meara & Brock
Attorneys
THE NORRIS PETERS CO., WASHINGTON, D. C.

UNITED STATES PATENT OFFICE.

BARBARA C. INWOOD, OF NEW YORK, N. Y.

COCOA AND CHOCOLATE POT ATTACHMENT.

978,298.  Specification of Letters Patent.  Patented Dec. 13, 1910.

Application filed July 13, 1908. Serial No. 443,182.

*To all whom it may concern:*

Be it known that I, BARBARA C. INWOOD, a citizen of the United States, residing in New York city, State of New York, have invented a new and useful Improvement in Cocoa and Chocolate Pot Attachments, of which the following is a specification.

This invention relates to attachments for cocoa and chocolate pots, the object being to provide a device which can be easily and quickly attached to an ordinary cocoa or chocolate pot which will enable the user to agitate the contents of the pot so that the chocolate or cocoa will be thoroughly stirred up while being made.

Another object of my invention is to provide a device which is exceedingly simple and cheap in construction, and one which is operated by simply pressing on a knob extending above the cocoa or chocolate pot.

This invention consists essentially in providing a rod adapted to be mounted vertically within the pot having a coiled portion adjacent its lower end which is adapted to be contracted or compressed by pushing downwardly on the rod, so that when released it will expand, this being repeated quickly it thoroughly agitates the contents of the pot.

The invention consists also in the novel features of construction, combination and arrangement of parts hereinafter fully described and pointed out in the claim.

In the drawing forming a part of this specification: Figure 1 is a side elevation of a chocolate or cocoa pot partly broken away, showing the application of my improved attachment. Fig. 2 is a detail enlarged vertical section. Fig. 3 is a perspective view of the attachment detached, and Fig. 4 is a detail section showing the manner of connecting the knob to the rod.

In carrying out my improved invention I employ a cocoa or chocolate pot A which has a concaved bottom A' provided with a central recess A² forming a socket in which the lower end B' of a rod B is adapted to fit which extends out through the top of the pot, and is provided with a threaded end over which is adapted to be secured a knob C, it of course being understood that a suitable opening is formed in the top large enough to allow the rod to move freely therethrough, so that it can be readily worked up and down or removed when it is desired to clean the same.

The rod is coiled in the form of a double spiral as shown at B², and by pressing down upon the knob, the coils will be compressed and as soon as pressure is released, will spring back to their normal positions and by quickly repeating these compressions and expansions the cocoa or chocolate will be thoroughly agitated, and all settling prevented.

As before stated I prefer to make the bottom concaved and have the depression at the center of the bottom, but this pot can also be used without the attachment by simply removing the knob and withdrawing the rod from the lid. By this arrangement I am also able to attach and detach the attachment from the pot quickly so that it can be thoroughly cleaned.

I have found by experimenting that better results can be obtained with my attachment when used in connection with a pot having the concaved bottom as the cocoa and chocolate will settle in the lowest portion of the same which is at the point where the attachment has the greatest agitating effect. It will be seen that by forming the rod with the coil of some flexible material, it will yield when pressure is applied to the upper end and return to its normal position when released at the same time expanding and contracting as the coil is formed spirally.

Having thus fully described my invention, what I claim as new and desire to secure by Letters Patent is:—

In a cocoa and chocolate pot attachment, the combination with a pot having a concaved bottom terminating in a central depression forming a socket and having an opening in its cover in vertical alinement with said socket, of a rod having its lower end mounted in said socket and extending through the opening in the cover, said rod having a threaded upper end, a knob mounted on said end, said rod having its lower end portion coiled to form a double spiral adapted to be compressed and expanded by pressing on said knob.

BARBARA C. INWOOD.

Witnesses:
 CHAS. E. BROCK,
 BENJ. L. AVERY.